United States Patent
Hsu et al.

(10) Patent No.: US 8,957,608 B2
(45) Date of Patent: Feb. 17, 2015

(54) MOTOR-DRIVING DEVICE OF AN ELECTRIC CAULKING GUN

(71) Applicant: Techway Industrial Co., Ltd., Taichung (TW)

(72) Inventors: Chih-Hua Hsu, Taichung (TW); Sen-Hsien Fang, Taichung (TW); Tain-Meei Lee, Taichung (TW); Hong-Yao Chen, Taichung (TW)

(73) Assignee: Techway Industrial Co., Ltd., Taichung (TW)

( * ) Notice: Subject to any disclaimer, the term of this patent is extended or adjusted under 35 U.S.C. 154(b) by 124 days.

(21) Appl. No.: 13/741,696

(22) Filed: Jan. 15, 2013

(65) Prior Publication Data

US 2014/0197762 A1 Jul. 17, 2014

(51) Int. Cl.
 *F02D 15/00* (2006.01)
 *H02K 7/14* (2006.01)
 *H02P 7/00* (2006.01)
 *B65D 83/00* (2006.01)

(52) U.S. Cl.
 CPC .......... *H02P 7/0038* (2013.01); *B65D 83/0005* (2013.01)
 USPC ............... 318/3; 318/280; 318/281; 318/286; 222/63; 222/251

(58) Field of Classification Search
 CPC .................................................. B05C 17/0103
 USPC ................. 318/3, 280, 281, 286; 222/63, 251
 See application file for complete search history.

(56) References Cited

U.S. PATENT DOCUMENTS

| | | | | |
|---|---|---|---|---|
| 6,823,134 | B2* | 11/2004 | Glasgow et al. | 310/50 |
| 7,420,341 | B2* | 9/2008 | Glasgow et al. | 318/280 |
| 8,020,727 | B2* | 9/2011 | Herman et al. | 222/1 |
| 8,740,021 | B2* | 6/2014 | Naughton et al. | 222/333 |
| 2002/0067147 | A1 | 6/2002 | Glasgow | |

FOREIGN PATENT DOCUMENTS

FR WO9602819 A1 2/1996

* cited by examiner

*Primary Examiner* — Erick Glass
(74) *Attorney, Agent, or Firm* — Tracy M. Heims; Apex Juris, PLLC (57) ABSTRACT

A motor-driving device of an electric caulking gun has a micro-controller unit (MCU), a direction-changing module, a motor and a speed sensor. The direction-changing module and the speed sensor are electrically connected to the MCU. The direction-changing module is electrically connected to the motor, and the speed sensor detects a speed of the motor. The MCU is built in with a speed determination procedure comparing an actual speed of the motor acquired from the speed sensor with a preset speed. If the actual speed is lower than the preset speed, it indicates that the resistance at a tube nozzle of the electrical caulking gun increases and the direction-changing module increases the speed of the motor to maintain a preset caulk discharge rate. Given the motor-driving device, the operational inconvenience arising from the unstable caulk discharge rate of conventional electric caulking gun can be tackled.

12 Claims, 9 Drawing Sheets

MOTOR-DRIVING DEVICE OF AN ELECTRIC CAULKING GUN

BACKGROUND OF THE INVENTION

1. Field of the Invention

The present invention relates to a motor-driving device of an electric caulking gun and more particularly to a motor-driving device of electric caulking gun capable of maintaining a preset caulk discharge rate.

2. Description of the Related Art

Powered by electricity, a conventional electric caulking gun drives a push rod through a motor to repel the caulk in a caulk tube for the purpose of sealing up gaps and cracks. In consideration of different operation modes or demands for different caulk discharge rates, every conventional electric caulking gun is equipped with a variable speed mechanism to vary the speed of the push rod upon repelling the caulk in the caulk tube so that caulk in the caulk tube can be discharged from the tube nozzle at different speeds.

Despite the variable speed mechanism for adjusting the speed of the push rod to further vary the caulk discharge rate and speed, conventional electric caulking guns fail to evenly dispense caulk on a work piece upon overlapping, turning or gradually stopping discharging the dispensed caulk on the work piece. The issue of unevenly dispensed caulk is caused because the variable speed mechanism of the conventional electric caulking guns is unable to quickly adjust the caulk discharge speed during the caulk dispensing process.

Also, if the tube nozzle is blocked by foreign matter and the caulk cannot be smoothly discharged, if the caulk remained at the tube nozzle is hardened because of prolonged air contact, or if the formula or ingredients of caulk vary from manufacturer to manufacturer and the caulk discharge speed or rate also varies from caulk to caulk because of different resistance to discharged caulk arising different viscosity of caulk, operational inconvenience is caused as the caulk discharge rate is unsteady and users must manually remove the blockage at the tube nozzle or adjust the speed of the variable speed mechanism according to the ingredients of the selected caulk.

SUMMARY OF THE INVENTION

An objective of the present invention is to provide a motor-driving device of an electric caulking gun ensuring a stable caulk discharge rate of the electric caulking gun without causing blockage at a tube nozzle of the electric caulking gun.

To achieve the foregoing objective, the A motor-driving device of an electric caulking gun has a micro-controller unit (MCU), a direction-changing module, a power supply module, a power switch unit and a speed sensor.

The MCU is built in with a speed determination procedure comparing a speed of a motor with a preset speed and outputting a speed signal.

The direction-changing module is electrically connected to the MCU and the motor, and receives the speed signal to control the speed of the motor.

The power supply module is electrically connected to the MCU and the direction-changing module to supply an operating power to the MCU and the direction-changing module.

The power switch unit is connected in series between the power supply module and the MCU to switch power on or off and set up the speed of the motor.

The speed sensor is electrically connected to the MCU and the motor, detects the speed of the motor and outputs the speed of the motor to the MCU.

Given the foregoing motor-driving device, when a caulk discharge rate at a tube nozzle of a caulk tube of the electric caulking gun varies, the resistance to a push rod will be transmitted to the motor through a variable speed mechanism to lower the speed of the motor. At the moment, the MCU receives an actual speed of the motor transmitted from the speed sensor. The speed determination procedure compares the actual speed with the preset speed and output a speed signal to increase the speed of the motor so that the direction-changing module increases the speed of the motor to overcome the resistance to the push rod. Accordingly, the electric caulking gun can maintain a stable caulk discharge rate at the tube nozzle, and the unstable caulk discharge rate and the operational inconvenience of the conventional electric caulking guns can be resolved.

Other objectives, advantages and novel features of the invention will become more apparent from the following detailed description when taken in conjunction with the accompanying drawings.

DETAILED DESCRIPTION OF THE INVENTION

With reference to FIGS. 1, 2 and 3A to 3F, a motor-driving device 10 of an electric caulking gun in accordance with the present invention is mounted in the electric caulking gun and has a micro-controller unit (MCU) 11, a direction-changing module 12, a power supply module 13, a power switch unit 14, a speed sensor 15, a circuit breaker 16, a rectification module 17 and a forward and rewind signal amplification module 18. The MCU 11 is electrically connected to the direction-changing module 12 and the speed sensor 15. The direction-changing module 12 is electrically connected to a motor 20 in the electric caulking gun. The actual rotation speed of the motor 20 is detected by the speed sensor 15.

Figure 1:
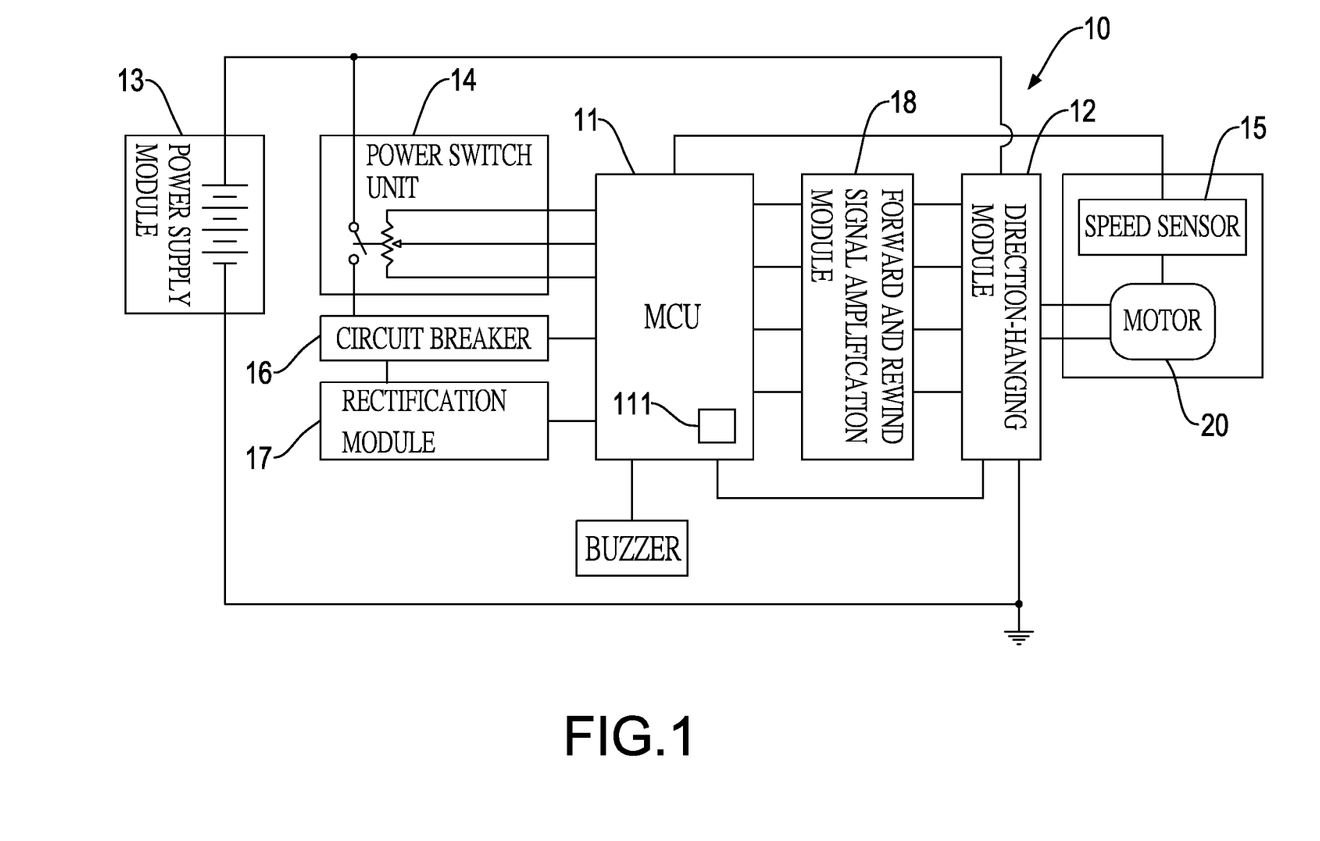
FIG. 1 is a functional block diagram of a motor-driving device of an electric caulking gun in accordance with the present invention.
Figure 2:
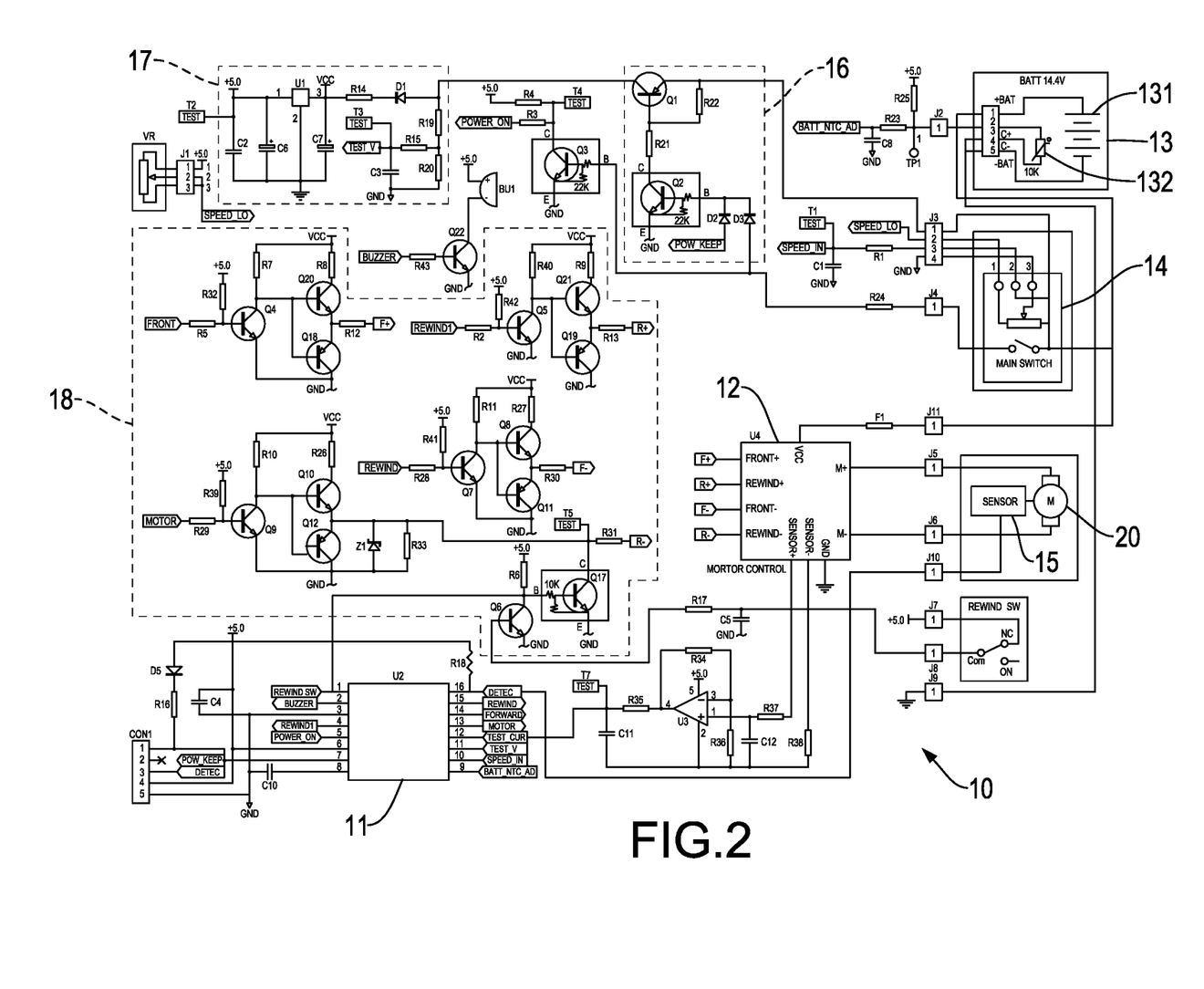
FIG. 2 is a circuit diagram of the motor-driving device in FIG. 1.
Figure 3A:
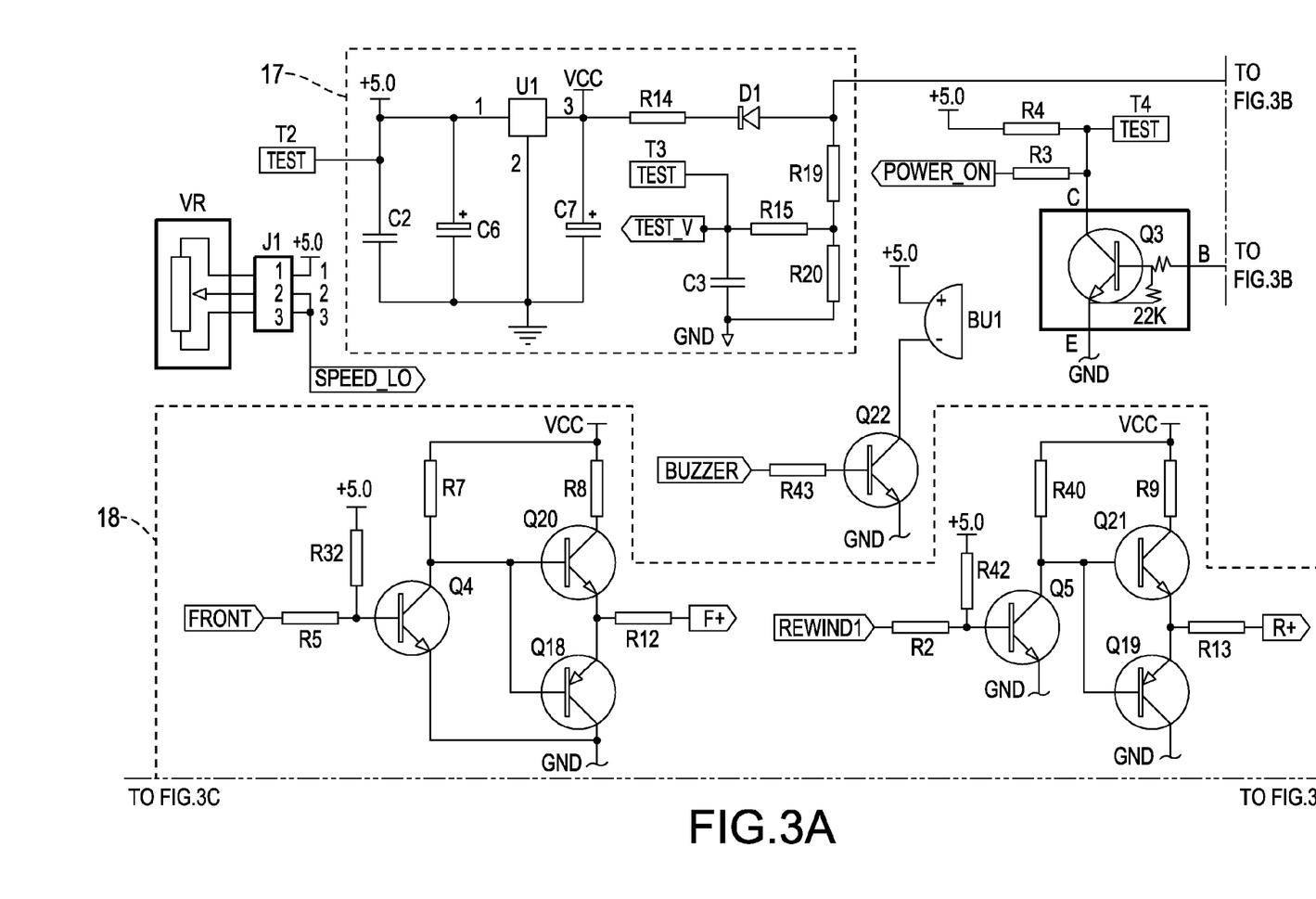
FIGS. 3A to 3F are partial circuit diagrams of the motor-driving device in FIG. 2.
Figure 3B:
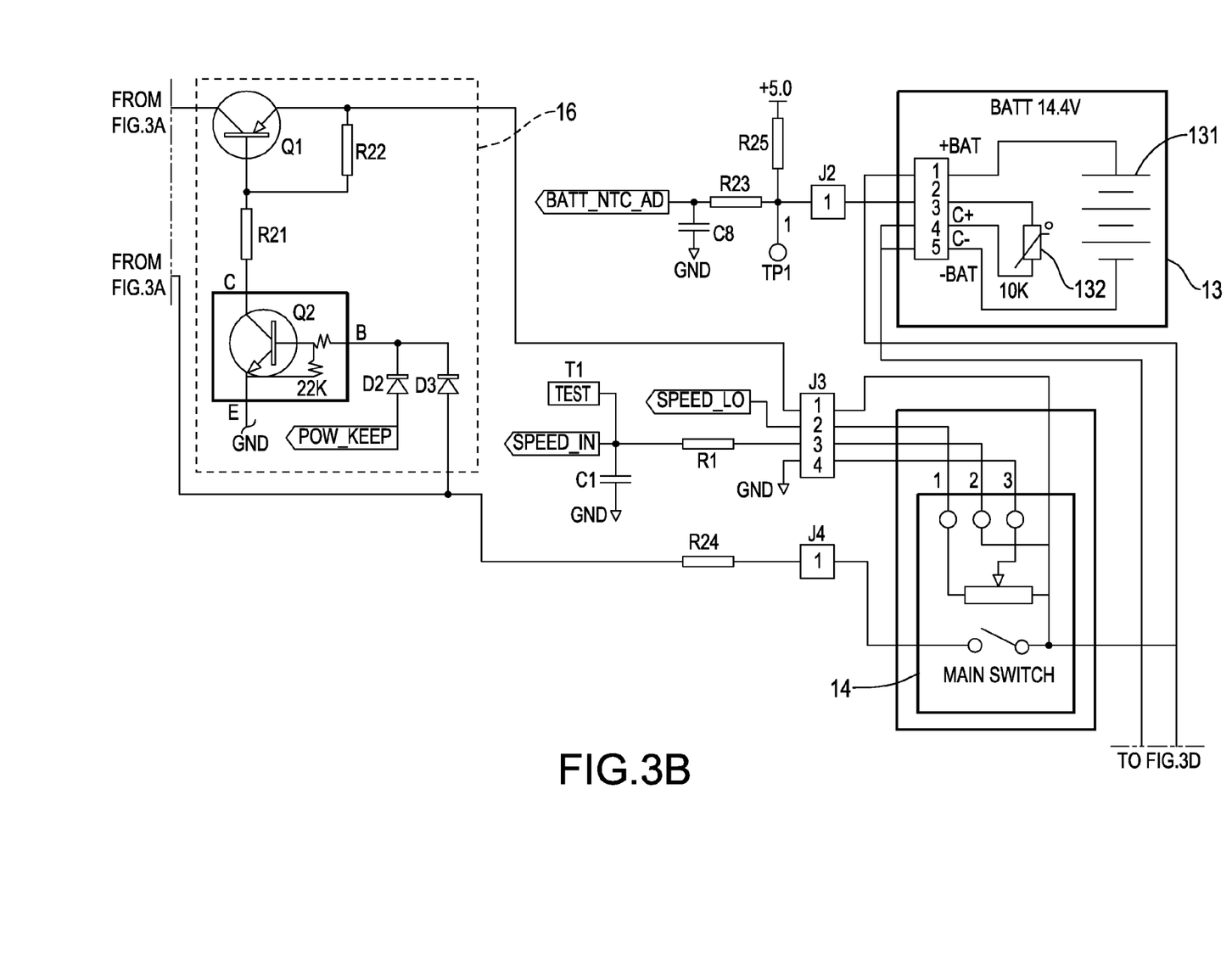
Figure 3C:
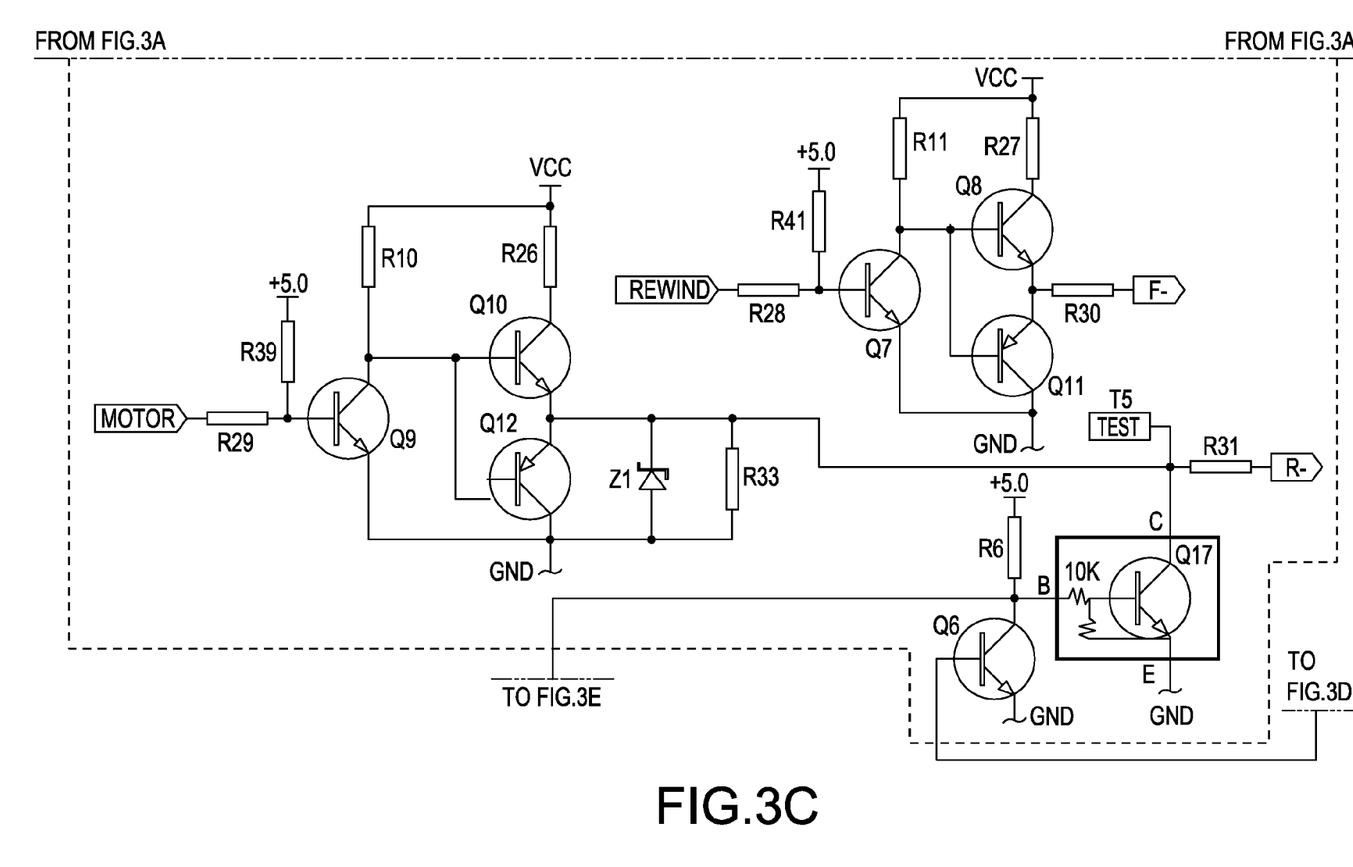
Figure 3D:
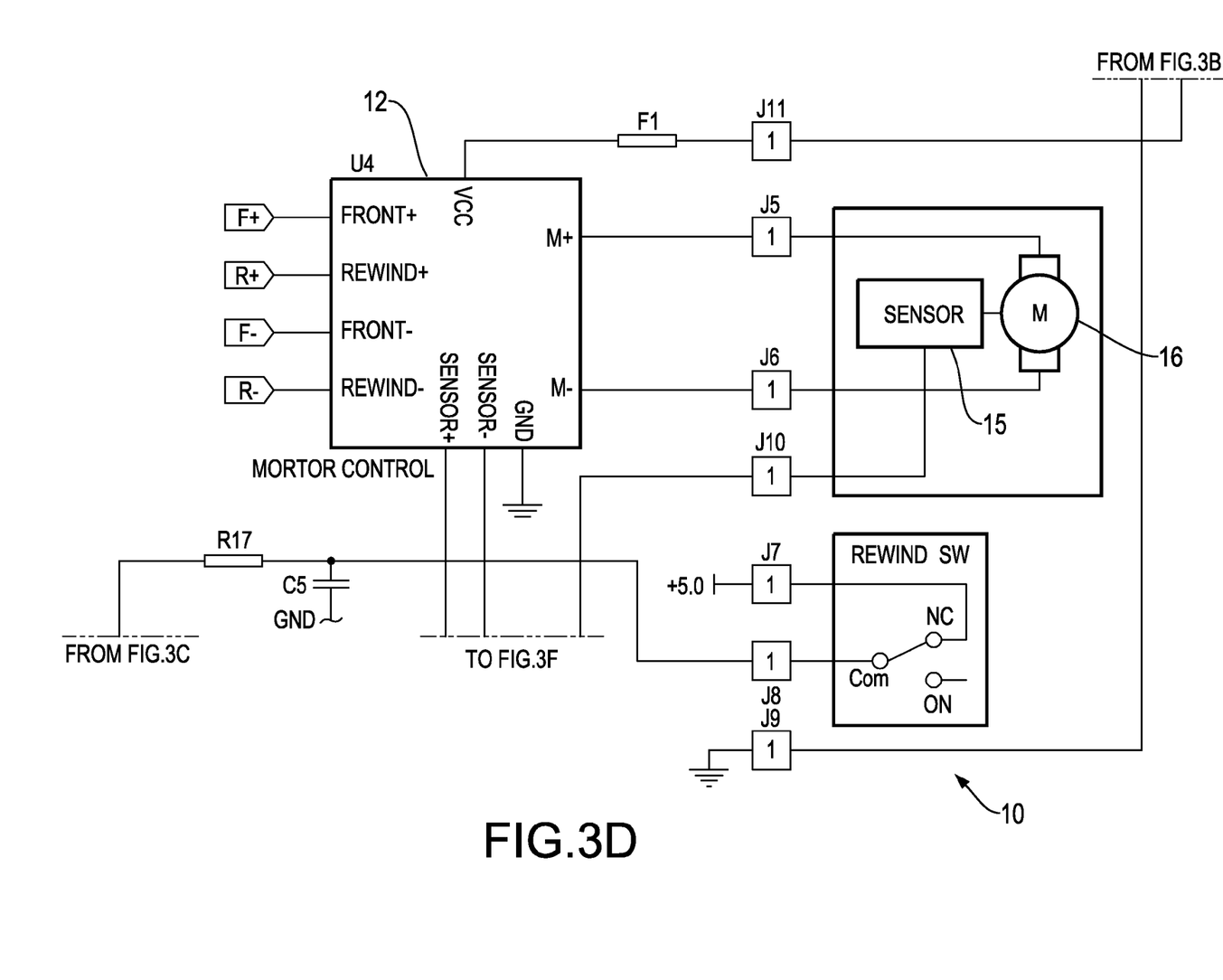
Figure 3E:
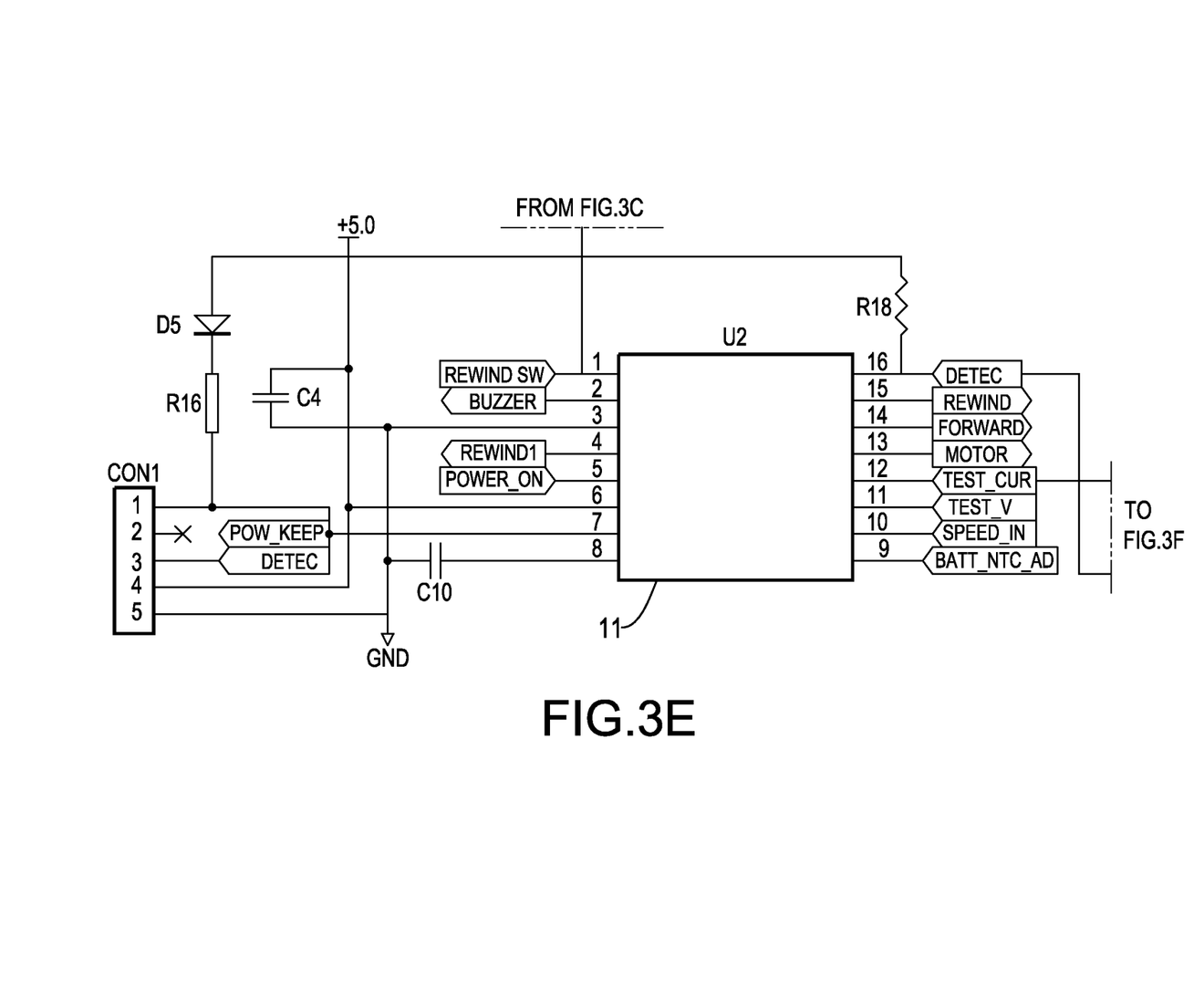
Figure 3F:
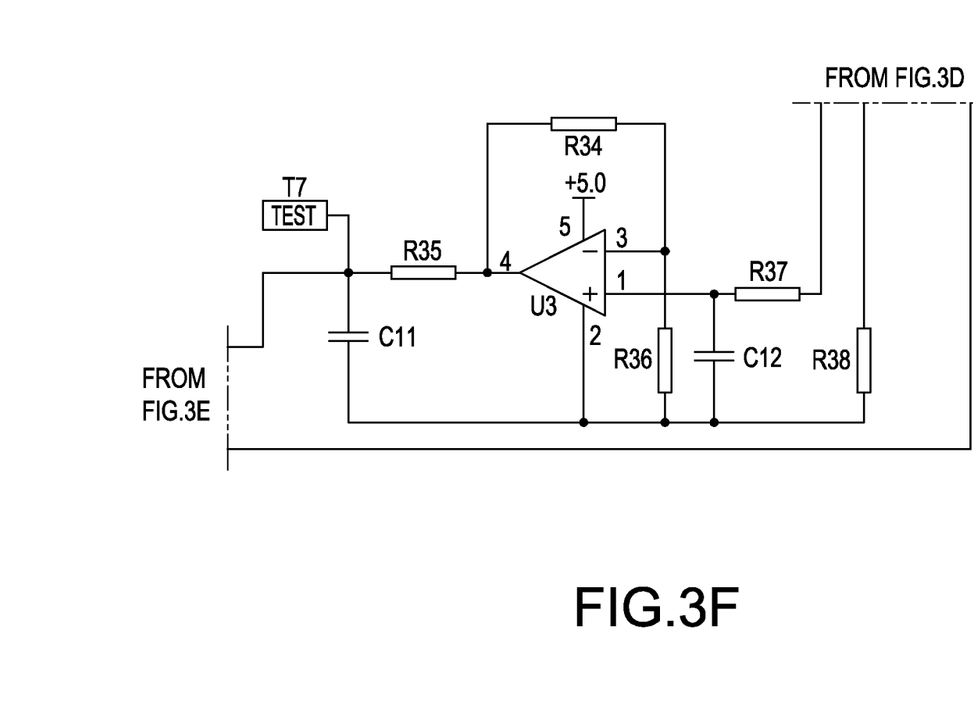
Figure 4:
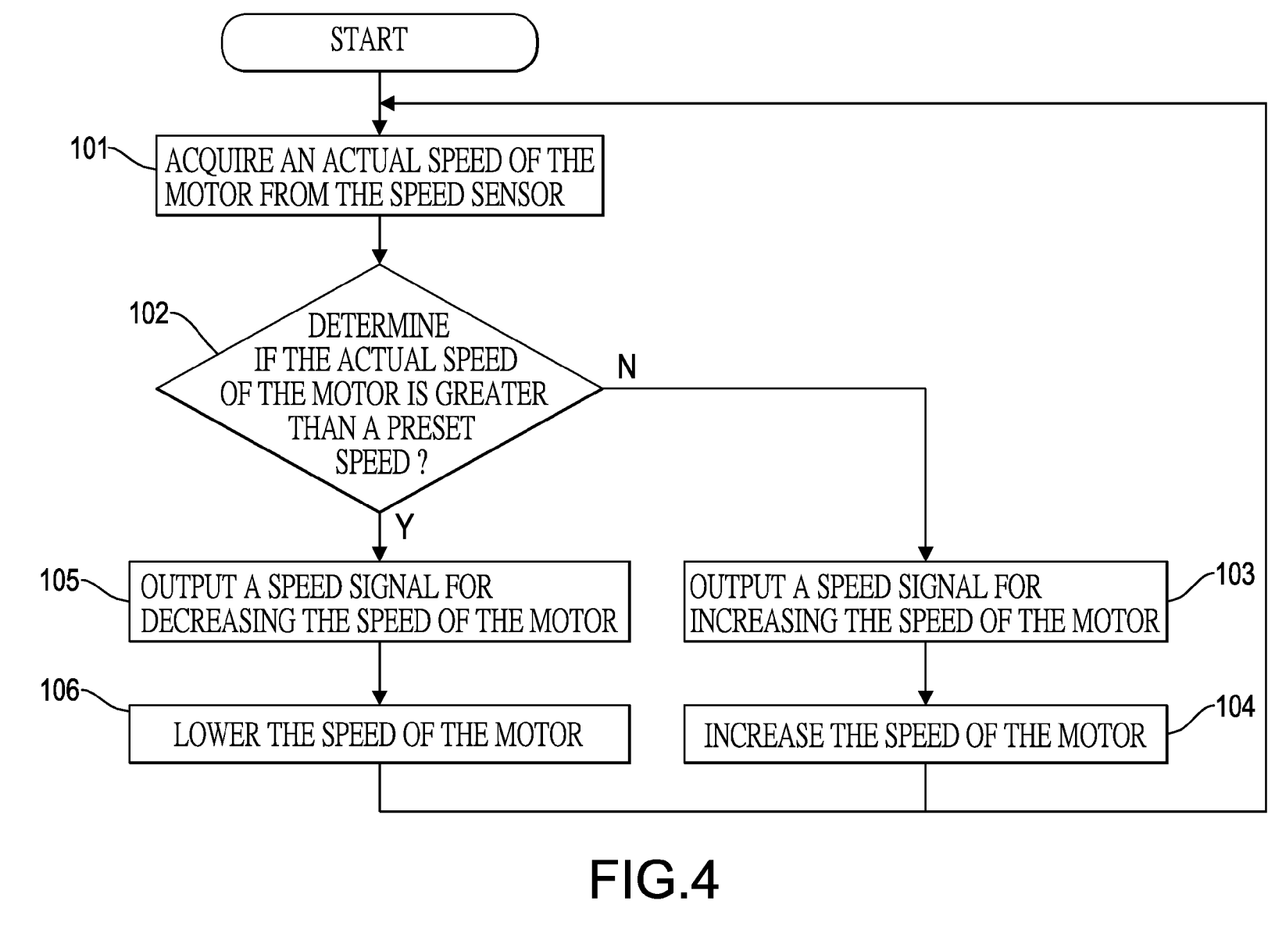
FIG. 4 is a flow diagram of a speed determination procedure of the motor-driving device in FIG. 1.

The MCU 11 has multiple pins respectively connected to the foregoing other elements 12~18. One pin DETEC is electronically connected to the speed sensor 15. The MCU 11 has a speed determination procedure 111 built therein. With reference to FIG. 4, the speed determination procedure 111 is performed by the MCU 11 and has the following steps.

Step 101: Acquire an actual speed of the motor 20 from the speed sensor 15.

Step 102: Determine if the actual speed of the motor 20 is greater than a preset speed.

Step 103: If the actual speed of the motor 20 is not greater than a preset speed, output a speed signal for increasing the speed of the motor.

Step 104: Increase the speed of the motor.

Step 105: If the actual speed of the motor 20 is greater than a preset speed, output a speed signal for decreasing the speed of the motor.

Step 106: Lower the speed or torque of the motor.

The direction-changing module 12 has two power pins VCC, GND, four control pins F+, F−, R+, R−, two motor pins M+, M− and two current-sensing pins SENSOR+, SEN- SOR−. The power pins VCC, GND are electrically connected to the power supply module 13. The control pins F+, F−, R+, R− are electrically connected to the forward and rewind signal amplification module 18. The direction-changing module 12 drives the motor 20 connected therewith depending on the signals of the control pins F+, F−, R+, R−. The motor pins M+, M− are electrically connected to the motor 20. The current-sensing pins SENSOR+, SENSOR− output a current value consumed by the motor 20. When the direction-changing module 12 detects an over-current condition or an abnormal temperature rise of the motor 20, the current-sensing pins SENSOR+, SENSOR− output signals to the MCU 11 for the MCU 11 to stop the motor 20 from operating.

The power supply module 13 has four pins +BAT, −BAT, C+, C−, a battery set 131 and a temperature sensor. The battery set is connected between two of the four pins +BAT, −BAT. The temperature sensor 132 is connected between other two of the four pins C+, C−. Batteries of the battery set 131 are connected in series to provide 14.4 V. The temperature sensor 132 is mounted in the proximity of the battery set 131 to detect operating temperature of the battery set 131. The two pins +BAT, −BAT of the power supply module 13 are electrically connected to the power switch unit 14 and the respective power pins VCC, GND of the direction-changing module 12 to supply operating power to the power switch unit 14 and the direction-changing module 12. The pin C+ of the power supply module 13 is electrically connected to a temperature detection pin BATT_NTC_AD of the MCU 11. In the present embodiment, the temperature sensor 132 is a NTC (Negative Temperature Coefficient) thermistor/When the temperature of the battery set 131 rises, the resistance of the temperature sensor drops so that the two pins C+, C− are closed or short-circuited, the temperature detection pin BATT_NTC_AD of the MCU 11 acquires an abnormal temperature rise signal from the power supply module 13, and the MCU 11 outputs a signal to the power switch unit 14 to switch off the power supply.

The power switch unit 14 has a variable speed switch MAIN SWITCH, a speed adjustment knob VR and a forward and rewind switch REWIND SW. The variable speed switch MAIN SWITCH is electrically connected to the power supply module 13 for switching on or off the power to the circuit breaker 16. The speed adjustment knob VR is electrically connected to the power switch unit 14 through a pin SPEED_LO to perform a single-stage or multi-stage speed control of the motor 20. The forward and rewind switch REWIND SW is connected to the forward and rewind signal amplification module 18 for the direction-changing module 12 to drive the motor in a forward mode or a rewind mode.

The speed sensor 15 serves to detect the actual speed of the motor 20 and transmits a speed value to the MCU 11.

The circuit breaker 16 has a transistor Q1 connected in series between the pin +BAT and the rectification module 17. The transistor Q1 is a power transistor receiving a signal POW_KEEP from the MCU 11 through another transistor Q2 to switch on or off the power output from the rectification module 17.

The rectification module 17 has a voltage regulation IC U1 lowering and rectifying voltage from the power supply module 13 to a stable 5V to supply a low-voltage DC power to each component. In the present embodiment, the voltage regulation IC is 7805.

The forward and rewind signal amplification module 18 has four sets of inverting amplification units. Each set of inverting amplification unit has four input pins MOTOR, FORWARD, REWIND, REWIND1 electrically and respectively connected to four of the pins MOTOR, FORWARD, REWIND, REWIND1 of the MCU 11, and four output pins F+, F−, R+ and R− electrically connected to the control pins F+, F−, R+ and R− of the direction-changing module 12, and receives the signals of the pins MOTOR, FORWARD, REWIND, REWIND1 from the MCU and outputs the signals to the control pins F+, F−, R+ and R− of the direction-changing module 12 after inverting amplification.

When the motor of the electric caulking gun drives the push rod to repel the caulk in the caulk tube, if the tube nozzle is blocked and the speed of the motor 20 is lowed or the output torque of motor 20 increases due to the resistance to the motor 20, the caulk discharge rate is unstable. Then, the speed sensor 15 acquires the actual speed of the motor 20 and sends the actual speed to the MCU 11. The speed determination procedure 111 in the MCU 11 compares the actual speed with a preset speed set up by users through the speed adjustment knob VR and adjusts the speed of the motor to the preset speed to overcome the resistance to the push rod. Accordingly, given the motor-driving device, a stable caulk discharge rate out of the tube nozzle of the electric caulking gun ensures that the operational inconvenience of the conventional electric caulking guns caused by unstable caulk discharge rate, blockage at the tube nozzle and reduced caulk discharge rate arising from different ingredients can be resolved.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A motor-driving device of an electric caulking gun comprising:
    a micro-controller unit (MCU) built in with a speed determination procedure comparing a speed of a motor with a preset speed and outputting a speed signal;
    a direction-changing module electrically connected to the MCU and the motor, and receiving the speed signal to control the speed of the motor;
    a forward and rewind signal amplification module connected in series between the MCU and the direction-changing module, receiving forward and rewind speed signals from the MCU and outputting the forward and rewind speed signals to the direction-changing module after inverting amplification;
    a power supply module electrically connected to the MCU and the direction-changing module to supply an operating power to the MCU and the direction-changing module;
    a power switch unit connected in series between the power supply module and the MCU to switch power on or off and set up the speed of the motor;
    a circuit breaker and a rectification module connected in series between the power switch unit and the MCU, wherein the circuit breaker has a transistor connected in series between a positive electrode of the power supply module and the rectification module and connected to the MCU through another transistor, and the rectification module has a voltage regulation IC; and
    a speed sensor electrically connected to the MCU and the motor, detecting the speed of the motor and outputting the speed of the motor to the MCU.

2. The motor-driving device as claimed in claim 1, wherein the direction-changing module has:
    two power pins connected to the power supply module; and
    four control pins connected to the forward and rewind signal amplification module.

3. The motor-driving device as claimed in claim 2, wherein the direction-changing module has two current-sensing pins detecting a current of the motor and outputting a signal to the MCU when the direction-changing module detects an overcurrent condition or an abnormal temperature rise of the motor.

4. The motor-driving device as claimed in claim 3, wherein the power supply module has:
- four pins;
- a battery set connected between two of the four pins; and
- a temperature sensor connected between other two of the four pins, and mounted in the proximity of the battery set to detect operating temperature of the battery set.

5. The motor-driving device as claimed in claim 4, wherein the power switch unit has:
- a variable speed switch connected to the power supply module;
- a speed adjustment knob connected to the power switch unit; and
- a forward and rewind switch connected to the forward and rewind signal amplification module.

6. The motor-driving device as claimed in claim 3, wherein the power switch unit has:
- a variable speed switch connected to the power supply module;
- a speed adjustment knob connected to the power switch unit; and
- a forward and rewind switch connected to the forward and rewind signal amplification module.

7. The motor-driving device as claimed in claim 2, wherein the power supply module has:
- four pins;
- a battery set connected between two of the four pins; and
- a temperature sensor connected between other two of the four pins, and mounted in the proximity of the battery set to detect operating temperature of the battery set.

8. The motor-driving device as claimed in claim 7, wherein the power switch unit has:
- a variable speed switch connected to the power supply module;
- a speed adjustment knob connected to the power switch unit; and
- a forward and rewind switch connected to the forward and rewind signal amplification module.

9. The motor-driving device as claimed in claim 2, wherein the power switch unit has:
- a variable speed switch connected to the power supply module;
- a speed adjustment knob connected to the power switch unit; and
- a forward and rewind switch connected to the forward and rewind signal amplification module.

10. The motor-driving device as claimed in claim 1, wherein the power supply module has:
- four pins;
- a battery set connected between two of the four pins; and
- a temperature sensor connected between other two of the four pins, and mounted in the proximity of the battery set to detect operating temperature of the battery set.

11. The motor-driving device as claimed in claim 10, wherein the power switch unit has:
- a variable speed switch connected to the power supply module;
- a speed adjustment knob connected to the power switch unit; and
- a forward and rewind switch connected to the forward and rewind signal amplification module.

12. The motor-driving device as claimed in claim 1, wherein the power switch unit has:
- a variable speed switch connected to the power supply module;
- a speed adjustment knob connected to the power switch unit; and
- a forward and rewind switch connected to the forward and rewind signal amplification module.

* * * * *